United States Patent [19]

Andreev et al.

[11] 3,893,420

[45] July 8, 1975

[54] METHOD FOR MASS SCALE REPRODUCTION OF PARASITIC INSECTS

[76] Inventors: Sergei Vasilievich Andreev, prospekt Stachek, 57, kv. 62, Leningrad; Mikhail Grigorievich Leibenzon, zavod 4, dom 6, kv. 6, Moskovskaya oblast; Jury Petrovich Trushin, Dmitrovskoe shosse 43, kv. 212, Moscow; Mikhail Sergeevich Luzgin, prospekt Mechnikova, 3, kv. 27, Leningrad, all of U.S.S.R.

[22] Filed: Oct. 25, 1973

[21] Appl. No.: 409,446

Related U.S. Application Data

[63] Continuation of Ser. No. 294,783, Oct. 4, 1972, abandoned.

[52] U.S. Cl. ................................................ 119/1
[51] Int. Cl. ............................................. A01k 67/00
[58] Field of Search ............. 119/1, 6; 43/107, 124, 43/132

[56] References Cited
OTHER PUBLICATIONS

DeBach (ed.), *Biological Control of Insects Pests & Weeds* 9/20/65, pp. 283–305, Group 330 (Plant Library).

*Primary Examiner*—Louis G. Mancene
*Assistant Examiner*—J. N. Eskovitz
*Attorney, Agent, or Firm*—Holman & Stern

[57] ABSTRACT

The method of mass-producing parasitic insects by infecting crop seeds with eggs of a host insect; collecting the imagoes of the host insect where their eggs are accumulated and attaching the imago eggs to a standard carrier; subjecting the eggs to climatic conditions and infecting the imago eggs with parasitic insects under climatic, natural conditions through phototaxis for conditioning the parasitic insect eggs so they are available for use in effective biological control material for controlling agricultural pests.

4 Claims, 1 Drawing Figure

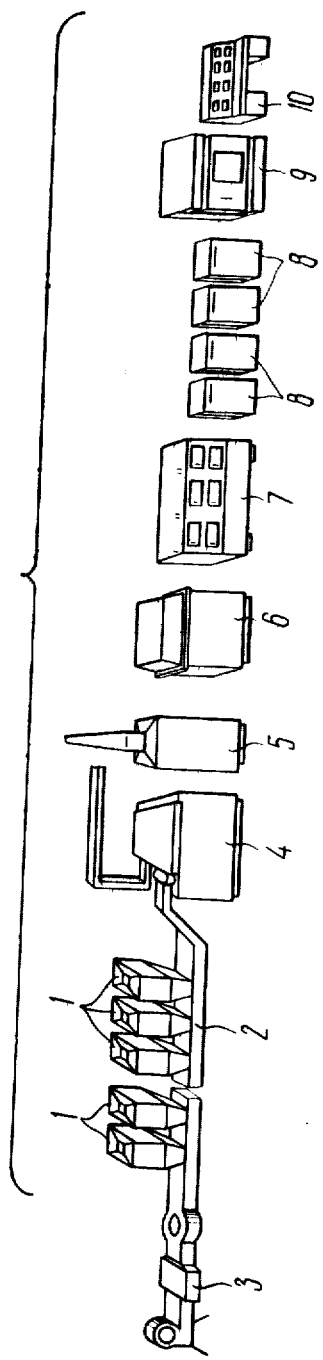

METHOD FOR MASS SCALE REPRODUCTION OF PARASITIC INSECTS

This is a continuation of application Ser. No. 294,783, filed Oct. 4, 1972, now abandoned.

FIELD OF THE INVENTION

This invention relates to agriculture, and more particularly it relates to biological protection of plants from pests.

BACKGROUND OF THE INVENTION

In order to reproduce parasitic insects, for example, ovivorous trichogramma (feeding on eggs) and carnivorous insects of Chrysopa genus, which are used for biological control of many agricultural pests, it is necessary to provide for the eggs of the host insect.

To this end, grain moths are cultivated artificially, whose eggs are used to subsist Chrysopa or to transfer in them the ovivores on the field.

In field conditions, the ovivore imagos infect the eggs laid by harmful insects and thus destroy them at the egg stage.

Known in the prior art is a method for a mass-scale cultivation of host insects, for example grain moths, which is realized as this: crop seeds, for example maize, are infected with eggs of grain moth in special boxes where the optimum temperature, humidity and light conditions are ensured. The images of the host are transferred through an insect duct (by using the reaction of the insects to light) to horizontal nets with a substrate capable of circular movement, upon which the imagos lay their eggs. The eggs are then removed from the nets. (See Inventor's Certificate No.254,939, USSR).

However, what interferes with the development of the progressive biological method of pest control, is insignificant capacity of the existing biological laboratories engaged in reproducing parasitic insects (e.g., trichogramma), low quality of the biological material and insanitary conditions of labor.

The method used at the present time in biological laboratories consists in the following. Grain moth eggs, obtained by the above described method, are placed in glass vessels wetted on the inside with water and distributed on the glass surfaces by setting the vessels in rotary motion.

Owing to the presence of sticky envelopes on the egg surface, they stick to the glass walls, and then eggs infected with trichogramma are added. The glasses are then covered with pieces of fabric or a fine sieve and exposed to light. The ovivores produced from the infected eggs mate and begin to infect the eggs of grain moth on the vessel walls. Owing to the presence of a positive phototaxis, the ovivores infect mainly those eggs which are exposed to direct illumination. For this reason, in order to ensure uniform infection of the eggs, the glass vessels should be periodically turned so that all eggs should be consecutively illuminated. As soon as all the eggs have been infected, they are detached from the glass surface by using a brush and placed into conditions of variable temperature until they are transferred into field. Then, one day before the release of the trichogramma from the eggs they are distributed in various vessels according to the existing standards. The ovivores lay their eggs into the eggs of the harmful insects. Trichogramma larvae develop inside the eggs, feeding upon the egg contents, thus destroying the insects in the egg state.

As becomes apparent from the described example, which is characteristic of the modern state of the problem of reproducing parasitic insects, for example, trichogramma, the following conclusion should be made: the existing method for reproducing trichogramma and the technique are primitive and labour taking.

For these reasons the existing method cannot ensure the required quantity of the "material" of the appropriate biological quality which is used in the biological control of agricultural pests.

SUMMARY OF THE INVENTION

The object of this invention is to provide a method, comprising the steps which make it possible to ensure controllable optimum conditions for the produced high-quality biological material, i.e., insects.

Another object of the invention is to provide an improved method to ensure the reproduction of the insects on a continuous flow-sheet principle.

Still another object of the invention is to provide an improved method in which sanitary conditions can be maintained at all stages of the process for reproduction of insects on a mass scale.

More particularly, objects are attained in a method, wherein infested host eggs are prepared and are glued onto a band in a one-egg thick layer in uniform strips, the band is separated into cards containing equal numbers of eggs, the eggs glued on the band are subjected to conditions in climatic chambers where, by utilizing phototaxis, infection of the eggs is achieved and is ensured by the movement of the insects from the infected eggs to the eggs to be infected, whereafter the infected eggs are subjected to conditions in climatic chambers where natural conditions are imitated for the insects of a given species.

Moreover, the objects of the invention are attained by removing host eggs from the nets, the nets and substrates are separated from one another at the end of a horizontal pathway, while in the lower part of their path, the net and the substrate are washed and dried to prepare for another cycle.

Moreover, the objects of the invention are attained by that preliminarily cleaned eggs of the host insect are glued onto the band in continuous spaced strips, the band comprising crosswise and longitudinal stripes possessing lower mechanical strength (as compared with the other material of the band) which facilitates separation of the band into cards.

The objects of the invention are attained by placing cards with the eggs of the host insect one atop the other with parts of cards holding infected eggs of the host insect placed between them subjecting the cards to light applied alternately on each side of the cards to ensure complete and uniform infection of the eggs of the host insect with parasitic insects.

The use of the proposed method ensures the production of high quality "biologically standard" material in improved labour conditions at minimum man-power expenses.

The objects and advantages of the proposed method will become subsequently clear from a detailed description which follows hereinafter and illustrated by the appended drawing:

BRIEF DESCRIPTION OF THE DRAWING

The single FIGURE of the drawing comprises a diagramatic illustration of the apapratus used to effect the method of mass production of parasitic insects.

DESCRIPTION OF A PREFERRED EMBODIMENT

While developing our method, use was made of photo-, hydro-, and thermotaxis, i.e., the positive and negative reaction of the insects to various physical factors (light, moisture, temperature, air streams, vibration, etc). Positive and negative taxes were used to stimulate or retard the development of the insects in artificial conditions, and also to control the insect orientation movement, or their concentration in a mass-scale reproduction process.

At the first stage, for preparation of biologically adequate moths possessing higher vitality and free of inbreeding, the heterosis effect was used.

The crop seeds, for example barley, maize, and the eggs of the host insect, for example the eggs of grain moth were loaded into a container 1, where the imagos are grown. In order to ensure the continuity of the process of moth reproduction, the moth eggs should be infected with a certain time shift, that is, according to the calculations, the amount of grain in boxes to be gradually infected should keep pace with the daily requirement for moth reproduction. As a certain time passes (consecutively, with the appropriate time shift) first-generation moths appear. Starting with this moment, moths are periodically removed.

Owing to the negative reaction to light (negative phototaxis) the moth imagos concentrate in the lower part of the container for growing imagos 1 whence through a guide cone (at the bottom of the container) they are transferred into the insect duct 2. As moths accumulate in the insect duct 2, an air pump of a conditioner 3 is actuated by a command sent from a control panel 10 and the whole bulk of the moth imagos are carried with a current of air into a collector 4 for collecting the imagos and their eggs. After mating, the females lay eggs into cells of horizontal nets with a substrate which move circularly in the collector. Before the eggs of the host insect (moth) are removed from the nets, the substrate is separated from the net in the end of their horizontal pathway, where the eggs are removed from the nets by brushes and collected in a receptacle. Moth eggs removed from the collector 4 are separated from admixtures, scales, and remains of dead moths on a pneumatic separator 5.

Thus cleaned eggs can be used for cultivating ovivorous trichogramma or for multiplication of insects of prey Chrysopa.

According to the proposed method, the eggs of the host insect should be removed from the nets after separation of the net from the substrate so that the eggs should not be injured at the moment of their contact with the brushes; the nets and the substrate are prepared for another cycle by washing and drying.

In order to automate the process of production of trichogramma, use should be made of a device 6 for standardizing host-insect egg gluing onto the paper bands.

Before gluing the eggs, the band is provided with perforations in the form of lengthwise and crosswise lines which would further facilitate separation of the band into marks.

The marks are necessary for further standardizing of trichogramma release into areas under agricultural plants in order to protect them from pests.

Eggs are glued onto a band in a one-egg thick layer in separate strips thus preparing the band for further separation into cards and marks containing standardized numbers of eggs.

The eggs glued onto the band are then delivered onto a device 7 where moth eggs are infected with trichogramma. Part of cards with moth eggs infected with trichogramma are placed above the band with the eggs glued onto it, the quantity of the infected eggs being dependent on the biological potency of the particular trichogramma form (race).

As soon as the bands with the eggs are placed into the said device 7, climatic conditions stimulating those natural for the given form of trichogramma are provided in the device 7. The infection process is controlled by using the positive reaction of trichogramma to light.

Thus, by using sources of light and the presence of positive phototaxis in trichogramma, the efficacy of the infection process of 95–98 per cent is ensured.

As soon as moth eggs have been infected with trichogramma, they are removed from the device 7 and transferred into climatic chambers 8 for embryogenesis and preimaginal growth of trichogramma in moth eggs. Inside chambers 8 the temperature and moisture conditions are varied with the aid of a programme device which is necessary to imitate the natural conditions for trichogramma. When it is required, the program control device can ensure climatic variations which are characteristic of natural conditions for a given type of trichogramma (variation of temperature from 16° to 32°C and humidity from 60 to 85 per cent).

Thus, climatic chamber 8 ensures adaptation of trichogramma to the natural conditions at the stage of their artificial reproduction, which is very important for preparing the maximum effect in the further use of trichogramma in its biological control of argicultural pests.

Moreover, wherever it is necessary to retard the development of trichogramma, it can be placed into chambers 9 wherein the temperature is 2°–4°C at a relative humidity, 70–85 per cent.

What we claim is:

1. A method for mass-producing parasitic insects consisting of infecting seeds of grain crops with eggs of a host-insect; transferring imagoes hatched from the eggs into an insect-duct by using phototaxis and to horizontal nets with a substrate and collecting host-eggs from the imagoes on the substrate; removing the host-eggs from the nets; the improvement comprising attaching host-eggs removed from the nets in strips to a severable band including means for dividing the band into uniform sections containing a determinable number of host-eggs; subjecting the host-eggs attached to the band to controlled climatic conditions and infecting the host-eggs with eggs of parasitic insects; subjecting the parasitic insects during infection of the host-eggs to phototaxis to insure substantially complete infection of the host-eggs; and maintaining the infected host-eggs under climatic conditions normally encouraging birth of the parasitic insects in the infected host-eggs.

2. The method as set forth in claim 1, including the step of continuously directing the nets and substrate in a horizontal path of travel, diverting the substrate from the horizontal net at the end of their horizontal path of travel whereby the nets containing host-eggs are free from the substrate and the host-eggs can be readily removed and collected with minimal damage to the eggs.

3. The method as set forth in claim 1 including the step of forming the band upon which host-eggs are applied with weakened sections and forming equal rectangular sections from the gand whereby the number of infected eggs per card can be readily computed and introduction of the number of parasitic insect being released out in the field conditions being controlled can be readily computed.

4. The method as claimed in claim 1 including the step of juxtaposing cards having host-eggs attached thereto with the eggs exposed and subjecting the juxtaposed cards and exposed host-eggs to phototaxis and attracting the parasitic insects to the exposed host-eggs to insure maximum infection of the host-eggs.

* * * * *